June 13, 1967 — J. H. HUMISTON — 3,324,521

MAGNETIC FASTENING MEANS

Filed March 18, 1966

United States Patent Office 3,324,521
Patented June 13, 1967

3,324,521
MAGNETIC FASTENING MEANS
John H. Humiston, Watertown, Conn., assignor to Scovill Manufacturing Company, Waterbury, Conn., a corporation of Connecticut
Filed Mar. 18, 1966, Ser. No. 535,430
5 Claims. (Cl. 24—201)

This invention relates to magnetic fastening means especially useful for garments to be used by handicapped people. It is an improvement over the fastener disclosed in the patent to Brett 3,141,216.

The improvement is aimed to make such fasteners practical for garments, and has to do with the manner for holding the magnet and armature assemblies and their securement to the flaps of the garment. The invention provides not only a strong and reliable attachment of the fastener members, but also a construction which can be assembled easily by the type of machines now used for assembling snap fasteners to garments.

In particular, the invention utilizes a holder shell having an inner wall for gripping the magnet and armature, and also means to provide a ring into which the prongs of an attaching member after having pierced the flap may be clinched.

Still another object of the invention is to combine with the attaching member for each fastener element a shield to extend partially over the flap material which overlies the fastener element.

Other objects and advantages will hereinafter more fully appear.

In the accompanying drawing, I have shown for purposes of illustration, one embodiment which the invention may assume in practice. In the drawing.

Figure 1:
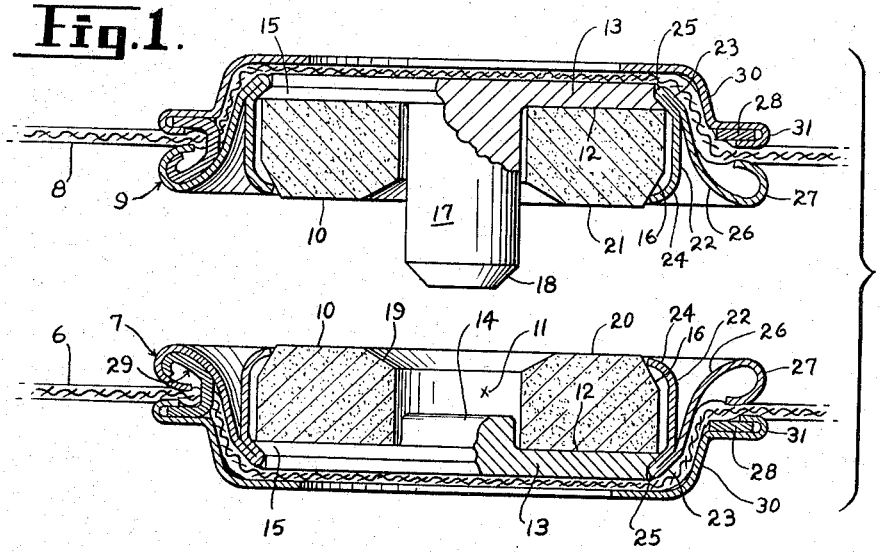
FIG. 1 is a central cross-section through the improved fastening means applied to garment flaps with the fasteners separated.

The fastener is intended primarily for garments having an inner flap 6 for female fastener elements 7 and an outer flap 8 for the male fastener elements 9. Each female fastener element has a permanent magnet 10 of generally cylindrical shape and an axial hole 11. Against the outer end face 12 of the magnet is mounted the armature 13 which consists of a disc of soft iron or steel, and which preferably has a relatively short pin 14 extending partway into the hole 11. The outer edge of the armature 13 has a beveled surface 15 and the corner of the magnet which extends inwardly from the flap 6 is also beveled as indicated at 16.

The construction involving the male fastener elements is generally the same as that which has already been described, and corresponding numerals are used where they apply. The pin 17 of the male element, however, is much longer than the pin 14 and projects through and beyond the magnet 10. It preferably has a tapered end 18 to cooperate with the inclined lead-in surface 19 of the magnet on the female element so that when the parts are brought together with the exposed end surfaces 20 and 21 of the female and male elements, respectively, somewhat close together, they will snap into place even though they are not in exact alignment. It will be understood that the magnets are so arranged that the end surfaces 20 and 21 which come into juxtaposition, are of opposing polarities.

Figure 2:
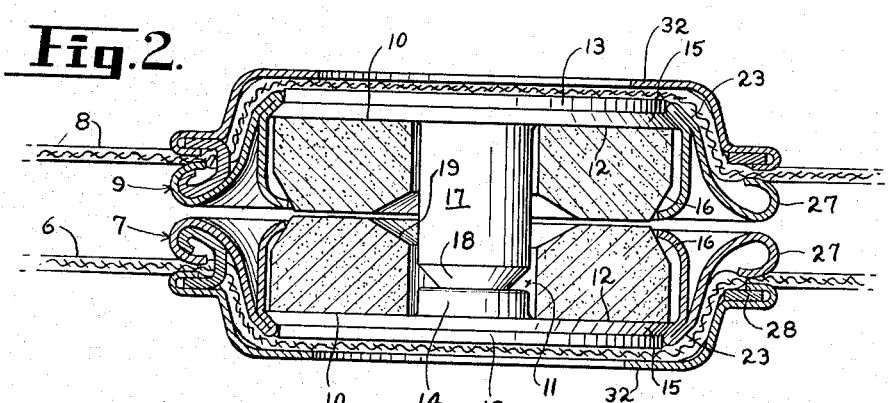
FIG. 2 is a similar view with the fasteners engaged.

It will also be seen in FIG. 2 that the combined length of the two pins 14 and 17 is slightly greater than the combined axial dimension or length of the two magnets so that they will abut each other, and preferably, there is left a slight clearance between the magnets in the closed position so as to insure the coming together of the pins 14 and 17. This is in the area of greatest magnetic flux and produces the greatest holding power when the fastener elements are engaged. The pin 17 projecting into the hole 11 will, of course, resist transverse stresses.

The manner for holding each of the armature and magnet assemblies together and for attaching them to the flaps 6 and 8 will now be described. For this purpose, there is provided a holder shell having an inner wall 22 with its outer edge 23 bent inwardly against the beveled surface 15 of the disc armature 13, and its inner edge 24 turned over into engagement with the beveled surface 16 of the magnet 10. This secures the magnet to its armature in a positive fashion as distinguished from adhesive, and without the necessity for close tolerances which might be required in a friction fit. At the same time, the construction is such that it can be assembled without breaking the magnet.

Joined to the inner wall 22 by the U-bend 25 is the outer wall 26 which flares outwardly and curls over around its outer edge to form the prong-retaining ring 27. The extent in the axial direction of both the inner and outer walls is substantially the same, but not quite as great as the magnet so that there will be no interference with the magnets coming to juxtaposition.

Figure 3:
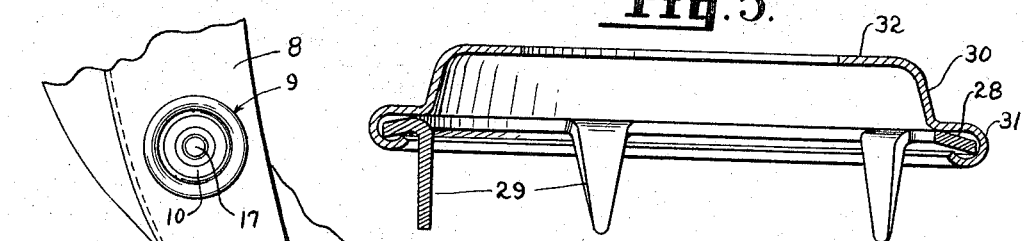
FIG. 3 is a central section of the improved attaching member.
Figure 4:
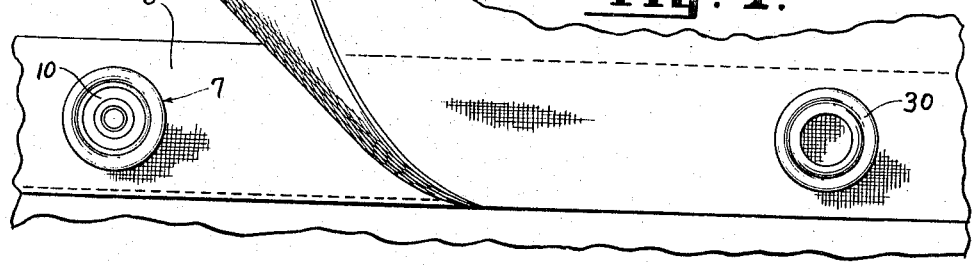
FIG. 4 shows a front view of a pair of flaps equipped with my improved fasteners.

The attaching member as best seen in FIG. 3, involves the use of the familiar prong ring having a rim 28 and a number of prongs 29 which pierce through the material of one of the flaps and bend over inside the retaining ring 27. In the assembled condition, the flap material extends over the magnet and armature assembly so as to cover the same and in order to protect this material from abrasion, I have provided a shield ring 20 having its rim clinched around the prong ring rim 28 as indicated at 31. The inner edge 32 of the shield ring projects partly over the magnet and armature so as to protect the flap material around the corners, leaving the central portion exposed.

It will be noted that the holder shell prong ring and the shield ring are the same for the male element as for the female element and corresponding reference numerals are applied.

My invention thus provides a new combination where the magnet and armature are effectively secured by means of a sheet metal holder shell, and formed as a unit with the holder shell is the retaining ring which accommodates a prong ring just as in the attachment of a common form of snap fasteners. The shell parts are the same for both elements and this tends to keep the cost of manufacture down. The entire assembly provides a practical solution for the first time to the use of magnetic fasteners on garments.

What I claim is:

1. In combination, a pair of flaps and magnetic fastening means therefor consisting of a male fastener element for one flap and a female fastener element for the other flap, each of said fastener elements comprising
    (a) a permanent magnet of generally cylindrical shape having an axial hole therethrough;
    (b) an armature in the form of a disc of magnetic material abutting one of the end surfaces of said magnet and covering said hole;
    (c) a holder shell having an inner wall engaging around said magnet and disc to hold them together;
    (d) said shell having an outer wall shaped into a prong-receiving attaching ring;
    (e) an attaching member in the form of a prong ring having prongs pierced through one of said flaps and clinched within said ring; and
    (f) the armature of said male fastening element having a pin extending through and beyond said hole in its magnet so as to engage in the hole in the magnet of the female element when the magnets are brought together with their end surfaces of opposite polarity in adjacent relation.

2. The combination defined in claim 1 wherein the armature of said female fastener element also has a pin but which is relatively short so as to extend only part-way through the hole in its magnet, the combined length of said pins being slightly greater than the combined lengths of said magnets to insure abutting of the ends of the pins for greatest holding power when the elements are brought together.

3. The combination defined in claim 1 wherein those ends of said magnets, which extend away from said supports, project slightly beyond said holder shell.

4. The combination defined in claim 1 wherein the corners of the magnet and armature assembly are beveled and wherein the edges of said shell inner wall are turned inwardly to engage against such beveled corners.

5. The combination defined in claim 1 wherein there is also provided a shield ring attached to said prong ring, the inward radial extent of said shield ring being such as to partly overlap said magnet and armature assembly.

References Cited

UNITED STATES PATENTS 3,041,697  7/1962  Badreck.
3,141,216  7/1964  Brett.

FOREIGN PATENTS 1,111,697  3/1956  France.

BERNARD A. GELAK, *Primary Examiner.*